United States Patent [19]
Parks et al.

[11] Patent Number: 5,524,248
[45] Date of Patent: Jun. 4, 1996

[54] RANDOM ACCESS MEMORY POWER MANAGEMENT SYSTEM

[75] Inventors: Terry J. Parks, Round Rock; David S. Register, Austin, both of Tex.

[73] Assignee: Dell USA, L.P., Austin, Tex.

[21] Appl. No.: 88,289

[22] Filed: Jul. 6, 1993

[51] Int. Cl.$^6$ .............................. G06F 1/32; G06F 12/00
[52] U.S. Cl. ........................................ 395/750; 395/431
[58] Field of Search ..................... 341/51, 67; 395/750, 395/425, 575, 275

[56] References Cited

U.S. PATENT DOCUMENTS

| | | | |
|---|---|---|---|
| 5,148,546 | 9/1992 | Blodgett | 395/750 |
| 5,175,543 | 12/1992 | Lantz | 341/51 |
| 5,185,883 | 2/1993 | Ianni et al. | 395/575 |
| 5,247,638 | 9/1993 | O'Brien et al. | 395/425 |
| 5,260,693 | 12/1993 | Horsley | 341/67 |
| 5,276,889 | 1/1994 | Shiraishi et al. | 395/750 |
| 5,283,905 | 2/1994 | Saadeh et al. | 395/750 |
| 5,390,334 | 2/1995 | Harrison | 395/750 |

*Primary Examiner*—Jack B. Harvey
*Assistant Examiner*—David A. Wiley
*Attorney, Agent, or Firm*—David McCombs; James Huffman

[57] ABSTRACT

Method and apparatus for power management of a RAM subsystem of a computer. Blocks of data stored at various addresses throughout the RAM subsystem are packed into unallocated memory space at the lowest possible physical location within the RAM subsystem and then are compressed. The packed and compressed data is then copied into the minimum number of RAM devices comprising the subsystem needed to store such data. The remaining RAM devices are either deenergized, if they comprise static RAM, or not refreshed, if they comprise dynamic RAM, thereby reducing the power consumption of the subsystem. Upon a command to return from the reduced power consumption mode, the above steps are executed in the reverse order and the blocks of data are copied to their original memory address locations in said RAM subsystem, using a table that is compiled during the packing step. The invention is implemented by computer program instructions executed in the computer CPU to operate a memory controller connected to the RAM subsystem.

23 Claims, 6 Drawing Sheets

RANDOM ACCESS MEMORY POWER MANAGEMENT SYSTEM

CROSS-REFERENCE TO RELATED APPLICATION

The present application is related to copending application Ser. No. 08/088,061 (Docket No. DC-00323) entitled MEMORY CONTROLLER WITH SELECTIVE REFRESH, filed on even date herewith, assigned to the assignee of the present application and hereby incorporated by reference as if reproduced in its entirety.

TECHNICAL FIELD

The invention relates generally to power management systems for computers and, more specifically, to a system of power management for a random access memory subsystem of a computer.

BACKGROUND OF THE INVENTION

Many components and peripheral devices of both desktop and portable personal computers consume a great deal of power even when they are not active. For this reason, power management systems have been developed which cause each component or peripheral device to operate in the lowest power consumption mode with respect to present demands thereon. One basic type of power management system commonly implemented on portable computers monitors various peripheral devices for I/O activity. After a predetermined period of I/O inactivity, the computer is "powered down", i.e., the system clock is halted and power is removed from the hard disk drive, the floppy disk drive, the liquid crystal display (LCD), and miscellaneous system circuitry, thereby effecting more efficient use of remaining battery power.

More recently, improvements in the basic power management system have been introduced which include options such as blanking the liquid crystal display (LCD) or monitor screen after a predetermined period of I/O inactivity or turning off the hard disk drive motor after the hard disk drive has not been accessed for a predetermined period of time. Furthermore, there may be provided more than one reduced power consumption mode. For example, there may be a "stand by" mode in which certain components, such as the LCD and the hard disk drive motor, are caused to operate in a reduced power consumption mode but the processing speed of the central processing unit (CPU) is not affected. In a "sleep" mode, nearly all of the functions of the computer are slowed or halted, including the CPU. From the standpoint of power consumption, the sleep mode is substantially equivalent to turning the computer off, except that no data is lost.

One area of power management that has not been heretofore addressed involves the random access memory (RAM) subsystem of a computer. In some computers, the RAM subsystem comprises dynamic RAM (DRAM) chips, which are composed of an array of memory cells each comprising a transistor network and an intrinsic capacitor. In operation, the transistor network charges or discharges the capacitor, depending on whether a "1" or a "0" is to be stored in the cell. It is well known that, in order to maintain the integrity of the data stored in the DRAM cells, the cells must be periodically refreshed. Such refreshing may be accomplished by reading each row of the DRAM array into sense amplifiers in the DRAM and then writing the data back into the row, a process commonly referred to as a "row-only refresh". Refreshing an entire DRAM subsystem consumes a large amount of power. For example, a single Toshiba 1 Mb×4 DRAM chip requires an average refresh current of 1.04 ma. Because a RAM subsystem will most likely include more than one such DRAM chip, the total power consumed by the subsystem during refresh will be substantially greater.

Alternatively, the RAM subsystem may comprise static RAM (SRAM) chips. Unlike DRAM cells, SRAM cells need not be periodically refreshed; however, SRAM cells must be constantly energized in order to retain data stored therein. As a result, the use of an SRAM subsystem gives rise to power consumption concerns similar to those discussed in connection with DRAM subsystems.

Typically, a computer system will include enough RAM to accommodate the largest applications program that is expected to be executed by the computer. Therefore, during the execution of most programs, a substantial portion of the subsystem will not be in use, i.e., will not contain valid data. Ideally, then, in order to reduce unnecessary power consumption, this portion of the subsystem should not be energized (in the case of SRAM) or refreshed (in the case of DRAM). However, while it is presently possible to energize or refresh only certain individual RAM chips, rather than the entire RAM subsystem, it has not been possible to energize or refresh only a portion of an individual RAM chip, i.e., only that portion that contains valid data and therefore needs to be energized or refreshed in order to maintain the integrity of that data.

In general, during normal operation of a computer each RAM chip will contain some valid data. This effectively eliminates the option of energizing or refreshing only particular chips, as all of them contain valid data and must be refreshed. As a result, a substantial amount of power is wasted superfluously energizing or refreshing memory cells within each chip that do not contain valid data, thereby limiting the total amount of RAM which, due to power management concerns, may be optimally included in a computer's RAM subsystem. A method of power management applicable to RAM subsystems would be especially beneficial in connection with computer devices such as Personal Digital Assistants (PDAs), which, because they have no means for attaching external memory storage devices, such as a disk drive, require a significant amount of internal memory storage and which, because they are battery powered, have significant power management concerns.

Therefore, what is needed is a method of power management applicable to a RAM subsystem of a computer that enables the subsystem to operate in at least one reduced power consumption mode, in which only that portion of the subsystem that contains valid data is energized or refreshed.

SUMMARY OF THE INVENTION

The foregoing problems are solved and a technical advance is achieved by a system of power management for a RAM subsystem of a computer. In a departure from the art, the RAM subsystem may be caused to operate in at least one reduced power consumption mode in which data contained in the subsystem is copied into the minimum number of RAM chips capable of storing the data so that only those RAM chips into which the data is copied must be energized or refreshed.

In a preferred embodiment, a computer capable of operating in a reduced power consumption mode comprises a RAM subsystem having a plurality of RAM devices each including memory addresses for storing data, a memory controller connected to the RAM subsystem for controlling the data storage status of the memory addresses, a central processing unit (CPU) and memory connected to the memory controller, and computer program instructions stored in the memory and executed in the CPU for operating the memory controller according to techniques of the invention for reducing the power consumption of the RAM subsystem.

Responsive to a command to operate in a reduced power consumption mode, logic comprising the program instructions is executed so that the blocks of data within the RAM subsystem are "packed", i.e., the holes between successive blocks are removed, and copied to the lowest unallocated equivalent memory block within the subsystem. A pointer containing the original address and size of each data block is also stored with the data to be used in unpacking the data. The packed data is then compressed using a lossless data compression method, such as the well-known Ziv and Lempel data compression method, and the compressed data is copied into the minimum number of RAM chips capable of storing the compressed data. The chip or chips in which the compressed data is stored continue to be energized or refreshed, while the remaining chips are powered down. As a result, a substantial amount of power can be saved by energizing or refreshing only a portion of the RAM subsystem.

Responsive to a command to return to full power mode, power is applied to the entire RAM subsystem, the compressed data is decompressed, and the packed data is "unpacked", i.e., copied back to its original location in the RAM subsystem, using the values contained in the pointers.

In an alternative embodiment, two levels of reduced power consumption are provided. Responsive to a command to enter a first reduced power consumption mode, the data is packed, as described above, and then copied to the minimum number of RAM chips capable of storing all of the packed data. Responsive to a command to enter a second reduced power consumption mode, the packed data is compressed and then copied to the minimum number of RAM chips capable of storing the compressed data, assuming that number is less than the number of RAM chips in which the packed data is stored.

In one aspect of the invention, the command to operate in the reduced power consumption mode(s) and the command to operate in the full power mode are issued responsive to a user's depressing a key on the computer that has been designated for that purpose. Alternatively, the command to operate in the reduced power consumption mode(s) is issued responsive to the expiration of a predetermined time interval during which there has been no I/O activity. For example, assuming an embodiment in which there are two levels of power consumption reduction, the command to operate in the first reduced power consumption mode may be issued after a fairly short period of I/O inactivity, for example, five (5) minutes. The command to operate in a second reduced power consumption mode may be issued after a longer period of inactivity, for example, fifteen (15) minutes, which may indicate that the user has inadvertently left the computer powered up after completion of a work session, thereby justifying a more drastic power reduction. The command to return to the full power mode would then be issued responsive to any I/O activity.

A technical advantage achieved with the :invention is that it reduces the overall power consumption of a computer by reducing the power consumption of the system RAM to a minimum level.

A further technical advantage achieved with the invention is that the number of RAM chips that may be included in a computer's RAM subsystem need not be restricted by power consumption concerns.

DETAILED DESCRIPTION OF THE PREFERRED EMBODIMENT

Figure 1:
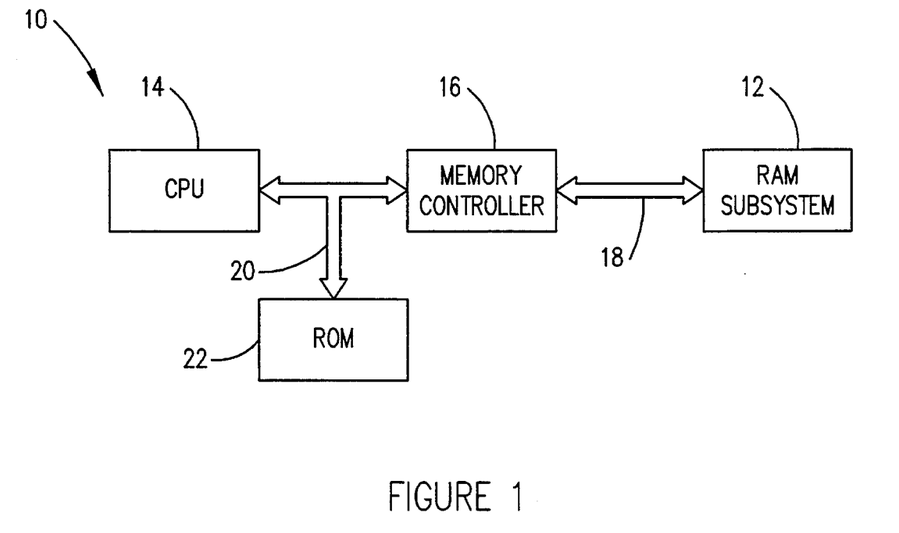
FIG. 1 is a block diagram of a computer embodying features of the present invention.

FIG. 1 is a partial block diagram of a computer 10 upon which the method of the present invention may be implemented. The computer 10 comprises a random access memory (RAM) subsystem 12 connected to a central processing unit 14 via a memory controller 16, a bus 18 and a system bus 20. As will subsequently be described in detail, the memory controller 16 controls the operation of the RAM subsystem 12, including energizing or refreshing the subsystem 12, in accordance with logic instructions stored in a read only memory (ROM) 22 connected to the CPU 14 and the memory controller 16 via the system bus 20. The subsystem 12 comprises a plurality of individual RAM chips, which may be either static (SRAM) or dynamic (DRAM), depending on the desired characteristics of the subsystem 12. It is understood that, for the purposes of clarity, only a portion of the computer 10 is illustrated in FIG. 1, although it will be understood by those skilled in the art that additional components will ordinarily be included therein.

Figure 2:
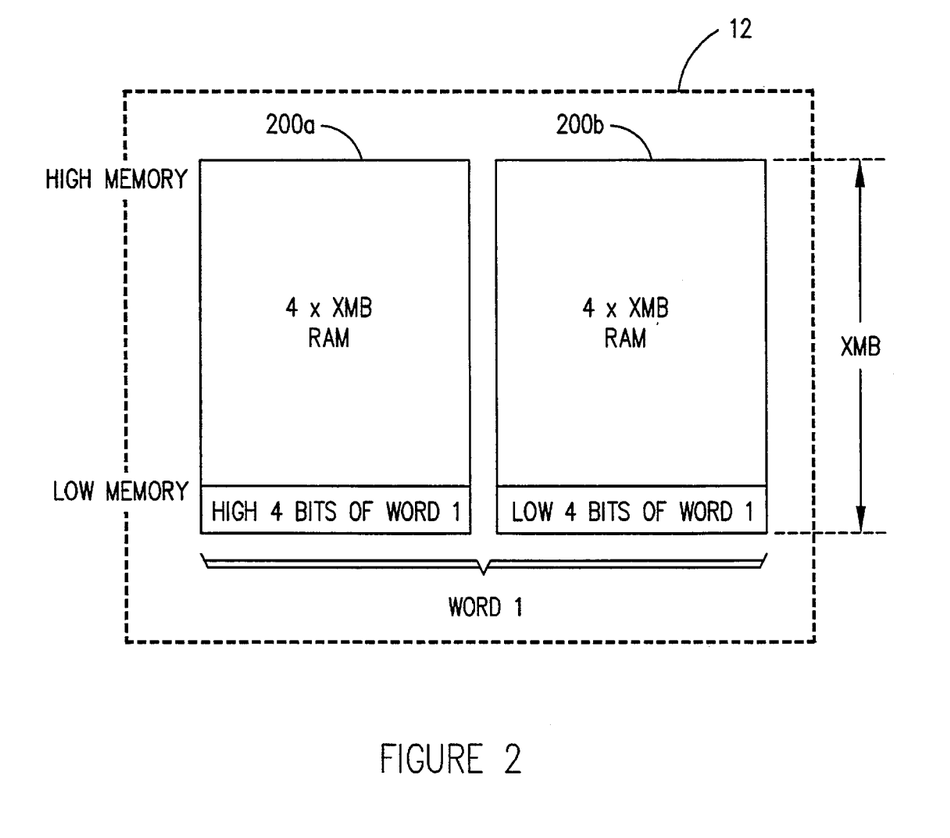
FIG. 2 is a block diagram of one embodiment of the RAM subsystem of the computer of FIG. 1.

FIG. 2 is a block diagram of a illustrative embodiment of the subsystem 12 of FIG. 1. It should be understood, that the embodiment shown in FIG. 2 is intended for illustrative purposes only and that the method of the present invention is applicable to any number of different embodiments of the subsystem 12; for example, the subsystem 12 may comprise additional RAM chips which may be larger or smaller than those illustrated in FIG. 2, depending on the desired size of the subsystem 12. In the embodiment shown in FIG. 2, the subsystem 12 comprises two RAM chips 200a and 200b, which, as previously indicated, may be either DRAM or SRAM chips. Each chip 200a and 200b is four bits wide by X Mb long and the word size of the computer 10 is 8 bits. Hence, the subsystem 22 is capable of storing X Mb 8-bit words, with the high four bits of each word being stored in the chip 200a and the low four bits of each word in the chip 200b.

It will be understood by those skilled in the art that it is a basic function of memory allocation and deallocation subroutines, some form of which are included in all computer operating systems, both to allocate and deallocate blocks of memory and to keep a record of the location and size of memory blocks which have been allocated. For example, in both UNIX and DOS operating systems, "MAL-LOC" and "FREE" subroutines perform memory allocation and deallocation, respectively.

Figure 2A:
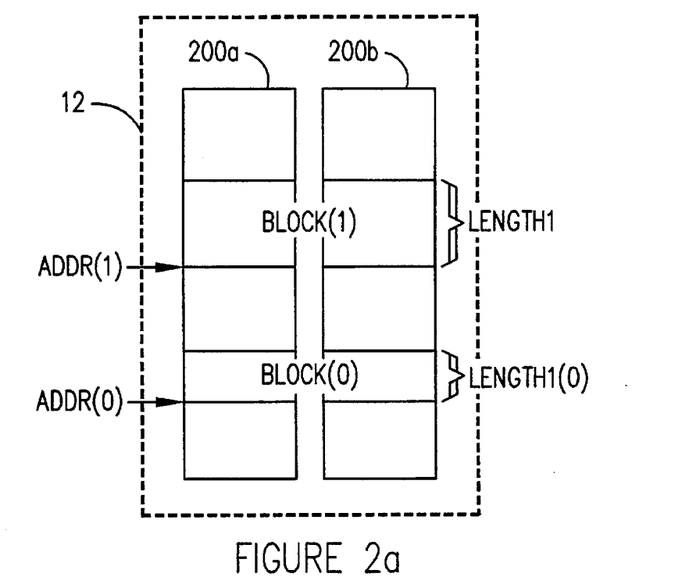
FIGS. 2a is an exemplary memory map of the RAM subsystem of FIG. 2.

FIG. 2a is a memory map of the subsystem 12 shown in FIG. 2, in which two blocks of memory have been allocated to store data. A first block of data, BLOCK(O), is stored in the chips 200a, 200b at an address ADDR1(0) and has a length LENGTH1(0). A second block of data, BLOCK(1), is stored at an address ADDR1(1) and has a length LENGTH1(1).

Figure 2B:
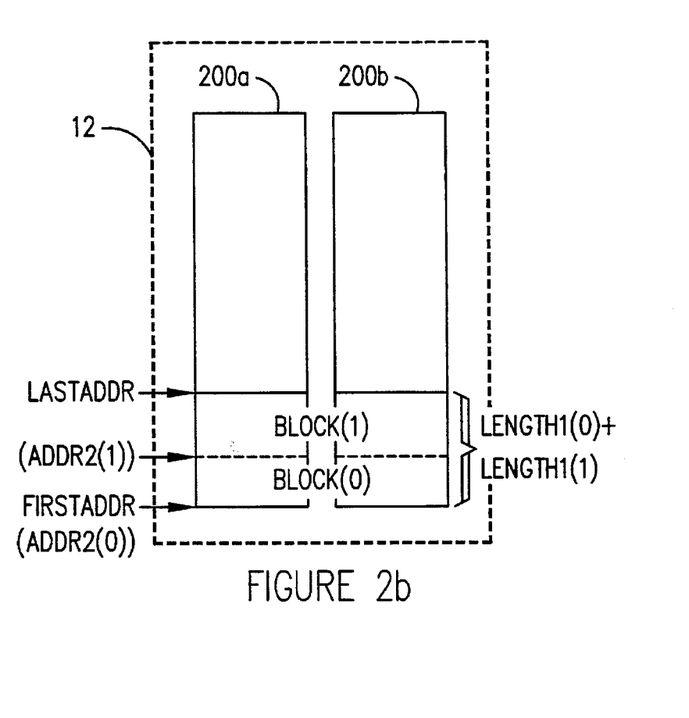
FIG. 2b is a memory map of the RAM subsystem of FIG. 2a after the data stored therein has been packed in accordance with the present invention.

FIG. 2b is a memory map of the subsystem 12 shown in FIG. 2a after the data (BLOCK(O) and BLOCK(1)) has been packed, i.e., the spaces between the blocks have been eliminated to comprise a single block of data having a total length LENGTH1(0)+LENGTH1(1). The packing of the data will be described in detail with reference to FIG. 3a. The packed data is stored at an address FIRSTADDR, and extends to an address LASTADDR.

Figure 2C:
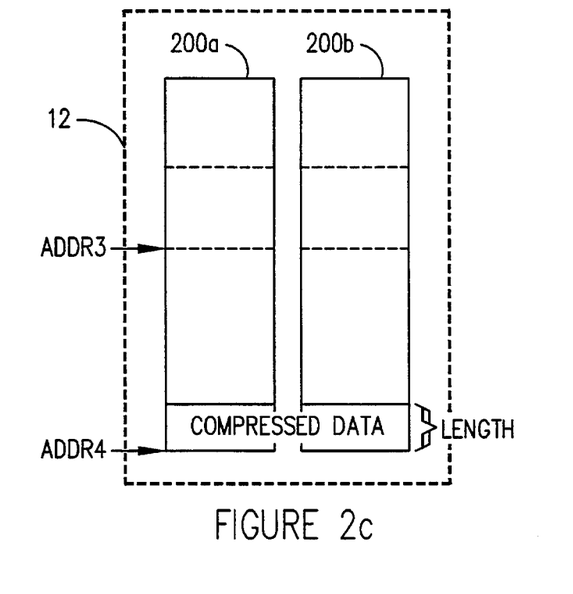
FIG. 2c is a memory map of the RAM subsystem of FIG. 2a after the packed data has been compressed in accordance with the present invention.

FIG. 2c is a memory map of the subsystem 12 shown in FIG. 2a after the packed data has been compressed using a lossless data compression method, as will be described in detail with reference to FIG. 3b. The compressed data is stored at an address ADDR4 and has a length LENGTH, which is less than LENGTH1(0)+LENGTH1(1).

Figure 2D:
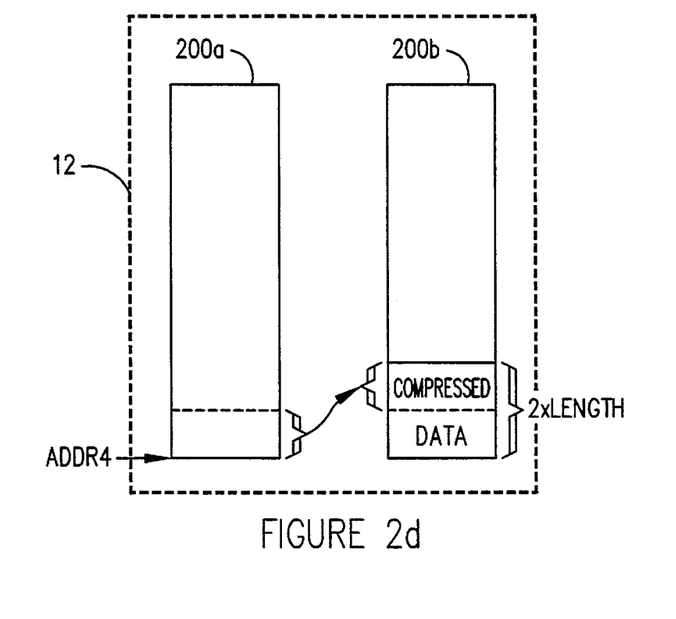
FIG. 2d is a memory map of the RAM subsystem of FIG. 2a after the compressed data has been copied into the minimum number of RAM chips in accordance with the present invention.

FIG. 2d is a memory map of the subsystem 12 shown in FIG. 2a after the compressed data has been copied into the minimum number of RAM chips 200a and 200b capable of storing the data, as will subsequently be described in detail with reference to FIG. 3c.

Figure 3A:
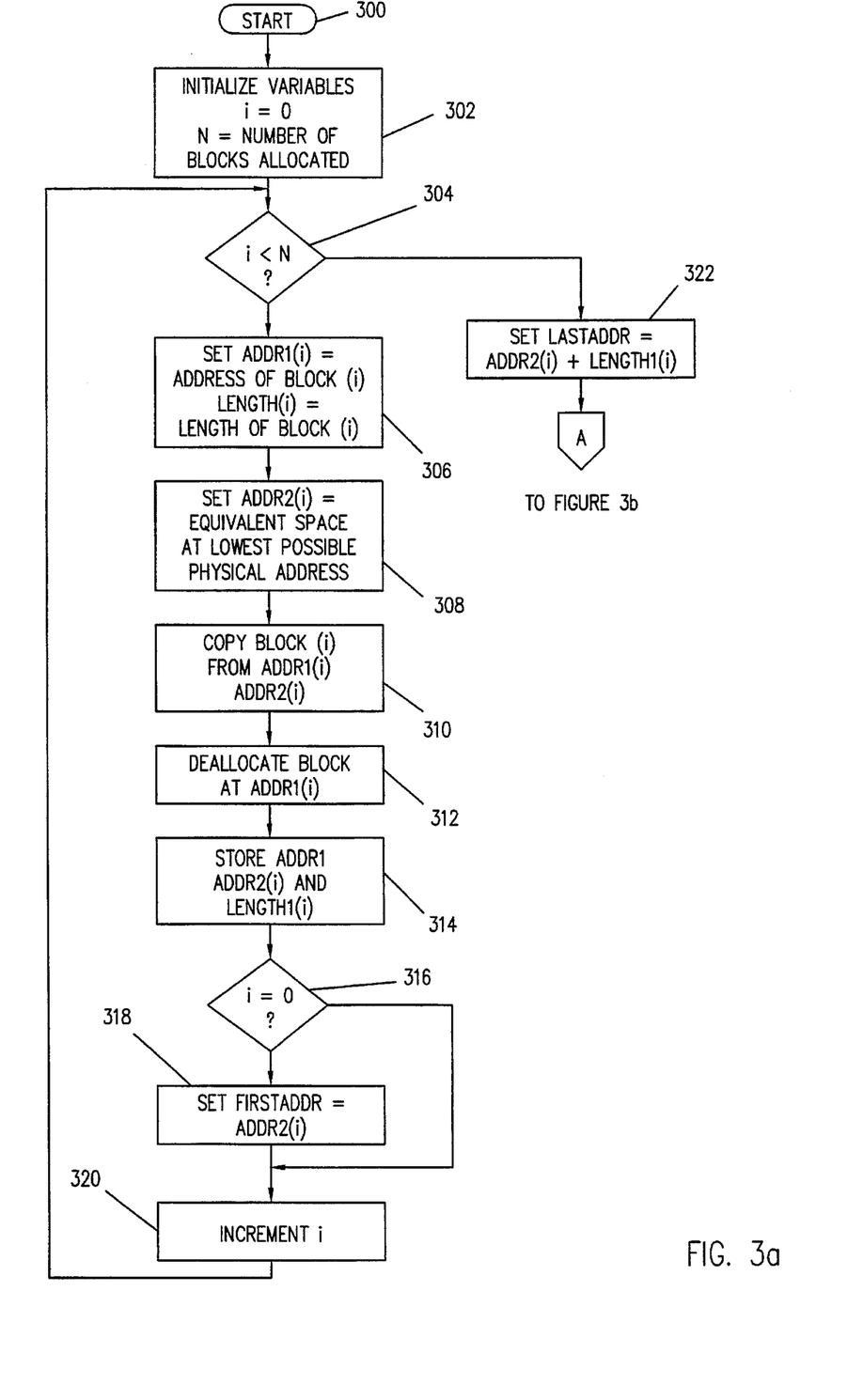
FIG. 3a is a flowchart of the operation of a packing routine of the present invention.
Figure 3B:
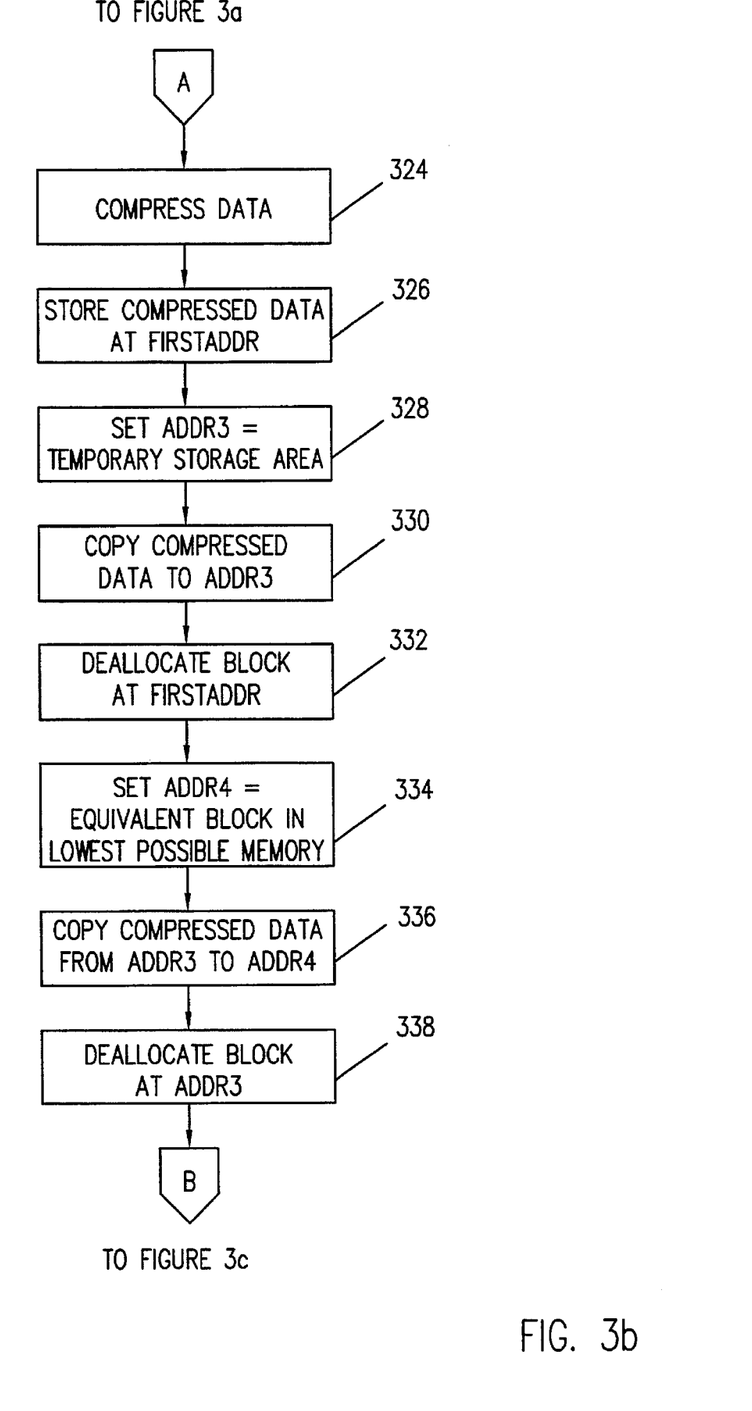
FIG. 3b is a flowchart of the operation of a compression routine of the present invention.
Figure 3C:
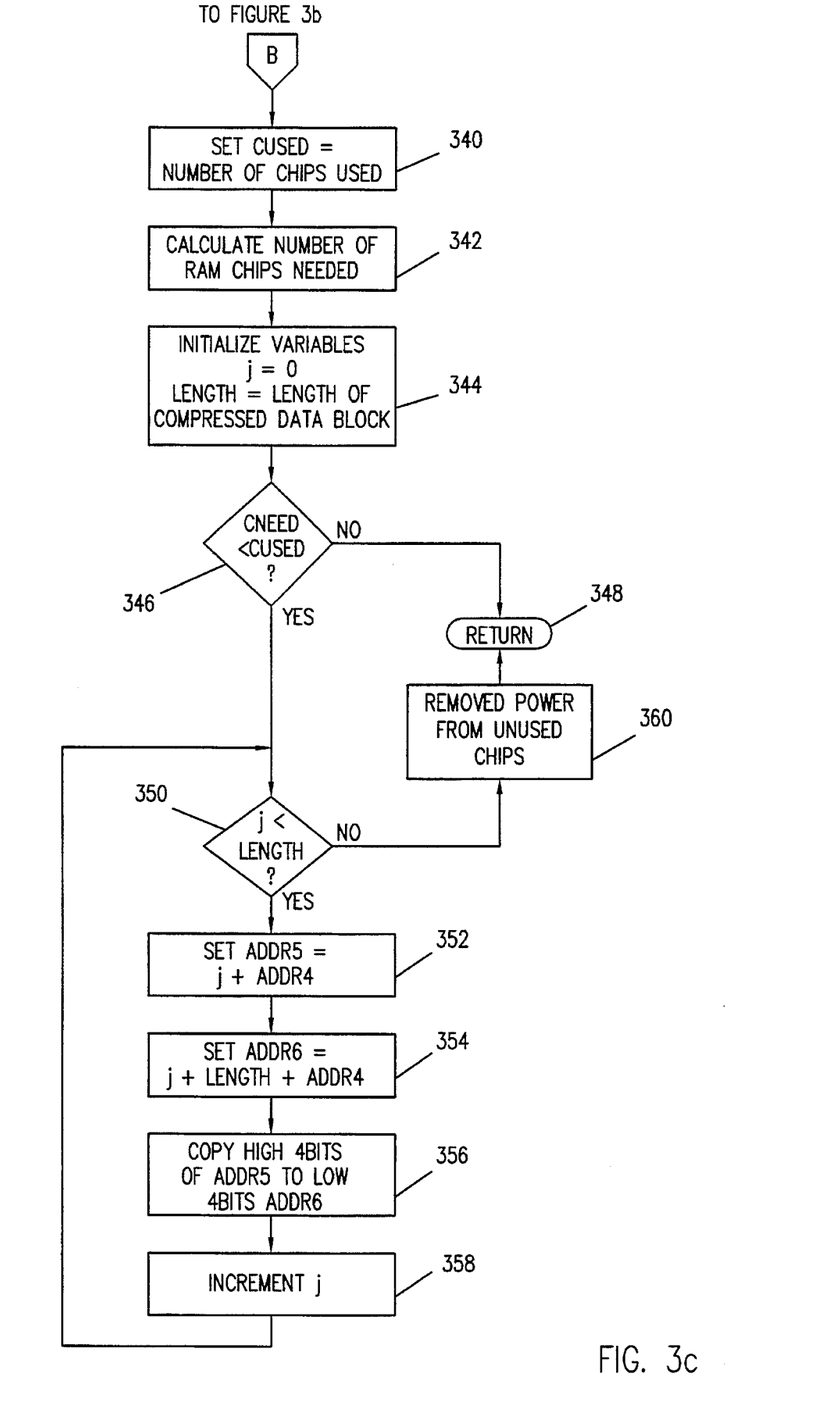
FIG. 3c is a flowchart of the operation of a minimization routine of the present invention.

FIGS. 3a–3c are flowcharts illustrating logic instructions that are stored in the ROM 22 and executed by the CPU 14 to operate the memory controller 16 in accordance with the present invention. Again, it is assumed for the sake of example that the subsystem 12 is configured as described with respect to FIG. 2, although the method is applicable to a number of different embodiments.

FIG. 3a is a flowchart illustrating logic executed by the CPU 14 for packing data stored in the subsystem 12 and copying each data block to the lowest possible physical address within the subsystem 12. Execution begins in step 300 in response to a command to operate in a reduced power consumption mode. In step 302, a variable N is initialized to equal the number of allocated blocks of memory, or blocks of data, which number is obtained from the operating system of the computer 10. For example, in the embodiment illustrated in FIG. 2a, N would be initialized to 2. In addition, a variable i, which is used to index a particular block of data, is initialized to zero (0).

In step 304, a determination is made whether i is less than N. If in step 304 it is determined that i is less than N, indicating that at least one block of data remains to be packed, execution proceeds to step 306. In step 306, a variable ADDR1(i) is set to equal the address of the block of data indexed by the current value of i (BLOCK(i)) and a variable LENGTH1(i) is set to equal the length of BLOCK(i). Execution then proceeds to step 308, in which a variable ADDR2(i) is set to equal the address of an available, or unallocated, block of memory of a length LENGTH1(i) at the lowest possible physical address in the subsystem 12. Execution then proceeds to step 310, in which BLOCK(i) is copied from ADDR1(i) to ADDR2(i). In step 312, the block of memory at ADDR1(i) is deallocated, or released, so that it can later be reallocated, if necessary. In step 314, the values of ADDR1(i), ADDR2(i) and LENGTH1(i) are stored as a pointer at designated location in memory (not shown) to be used in unpacking BLOCK(i), i.e., copying it to its original location in the subsystem 12 when the computer returns to full power mode. For example, the pointer may be stored with the packed BLOCK(i) or may be stored in a separate table with the pointers to the remaining blocks.

In step 316, a determination is made whether i is equal to zero (0). If in step 316, it is determined that i is equal to zero, indicating that BLOCK(i) is the first allocated block of data to be packed, execution proceeds to step 318, in which a variable FIRSTADDR is set to equal the value of ADDR2(i), so that FIRSTADDR addresses the beginning of the packed data block. Execution then proceeds to step 320. If in step 316, it is determined that i does not equal zero, indicating that BLOCK(i) is other than the first allocated block, execution proceeds directly to step 320.

In step 320, i is incremented by one to index the next data block. Execution then returns to step 304 and the steps 304–320 are repeated until a determination is made in step 304 that i is not less than N, indicating that all of the data blocks have been packed, in which case execution proceeds to step 322. In step 322, a variable LASTADDR is set to equal the value of ADDR2(i), which is now equal to the packed address of the last block of data, plus the value of LENGTH1(i), which is equal to the length of the last block of data. As a result, LASTADDR addresses the end of the packed data block. Execution then proceeds to step 324 (FIG. 3b).

FIG. 3b is a flowchart illustrating logic executed by the CPU 14 for performing a lossless compression of the packed data block and storing the compressed data block at the lowest possible physical address in the subsystem 12. In step 324, a lossless compression of the packed data block at FIRSTADDR is performed. It is understood that this compression can be performed using any one of a number of well-known techniques, including, for example, the Ziv and Lempel lossless data compression method. Because such types of data compression techniques are known to those skilled in the art, the specifics of the data compression will not be further described herein. In step 326, the compressed data block is stored at FIRSTADDR. In step 328, a variable ADDR3 is set to the address of a temporary storage block of the same length as the compressed data block. In step 330, the compressed data block is copied to ADDR3. In step 332, the block of data at FIRSTADDR is deallocated. In step 334, a variable ADDR4 is set to equal the address of an available, or unallocated, block of memory of a length equal to the length of the compressed data block at the lowest possible physical address in the subsystem 12. It should be noted that in the embodiment illustrated in FIG. 2c, FIRSTADDR addresses the same memory location as ADDR4. In step 336, the compressed data block is copied from ADDR3 to ADDR4. In step 338, the block of memory at ADDR3 is deallocated. Execution then proceeds to step 340 (FIG. 3c).

FIG. 3c is a flowchart illustrating logic executed by the CPU 14 for copying the compressed data in the fewest number of RAM chips capable of storing the compressed data so that power can then be removed from the remaining chips. In step 340, a variable CUSED is set to equal the number of chips in which data is stored, which may or may not be equal to the total number of chips 200a, 200b in the subsystem 12. In step 342, the number of chips needed to store all of the compressed data is computed by dividing the number of data bits being stored in the subsystem 12 (i.e., the number of bits in the compressed data block) by the total number of bits that can be stored in one RAM chip, which, in the embodiment shown in FIG. 2, is 4X Mb, and then rounding the result up to the next integer. The resulting number is stored in a variable CNEED. In step 344, a variable j, which is used as an index to address each word in the compressed data block, is initialized to zero and a variable LENGTH is initialized to the length of the compressed data block. In step 346, a determination is made whether CNEED is less than CUSED. If in step 346 it is determined that CNEED is not less than CUSED, indicating that it is not possible to store the data in fewer RAM chips, execution proceeds to step 348, in which the routine is exited. If in step 346 it is determined that CNEED is less than CUSED, indicating that the compressed data could be stored in fewer RAM chips, execution proceeds to step 350, in which a determination is made whether j is less than LENGTH. If in step 350 it is determined that j is less than LENGTH, indicating that the current value of j indexes a word within the compressed data block, execution proceeds to step 352. In step 352, a variable ADDR5 is set to equal the value of j+ADDR4. In step 354, a variable ADDR6 is set to equal the value of i+LENGTH+ADDR4. In step 356, the high four bits of the word at ADDR5 are copied to the low four bit position at ADDR6. In 358, j is incremented by one to index the next word within the compressed data block and execution returns to step 350. If in step 350, it is determined that j is not less than LENGTH, indicating that the value of j indexes a location beyond the compressed data block, execution proceeds to step 260, in which power is removed from the unused chip(s) and execution returns to step 248.

The removal of power (or elimination of refresh) from the unused chips may be accomplished by using the functions of the memory allocation and deallocation subroutines, which, as described above, record the location of valid data stored in the subsystem 20, in combination with logic instructions executed by the CPU 14 for applying power to, or refreshing, only those chips in which valid data is stored, as indicated by the memory allocation/deallocation subroutines. Alternatively, this system may be implemented in combination with the method disclosed in the cross-referenced copending application for refreshing only a portion of a particular DRAM chip. In that case, after the data has been packed, compressed and moved, only those rows in which data is stored are refreshed, thereby effecting an even greater power savings.

The above functions are further illustrated by the following pseudocode, which is written to be applied to the embodiment illustrated in FIG. 2:

```
Starting Point
Enter here on command to configure memory system for lowest power
This pseudo-code makes use of the following operating system calls:
n=n_alloc();                                    ;get number of allocated blocks from OS
addr=alloc_addr(i);                             ;get physical address of i'th block
length=alloc_len(i);                            ;and length
addr=_alloc(length);                            ;allocate space of length length
addr=low_alloc(length);                         ;allocate space of length length at lowest
                                                ;possible physical address
phys_copy(addr1,addr2,length);                  ;physically copy memory image of length
                                                ;length from addr1 to addr2
de_alloc(addr1);                                ;release a previously allocated block
len_after_comp=loss_less_comp(first_addr,last_addr);  ;optimally compress memory
                                                ;image from first to last address
                                                ;leaving compressed image at first_addr
high_bits(addr);                                ;gets high 4 bits of data at addr
Stage 1
Pack active memory to lowest possible physical address
This is a simplified model of a garbage collection system
Improvements could include optimization based on sizes of individual blocks, etc.
n=n_alloc();                                    ;get number of allocated blocks from OS
for(i=0;i<n;i++){
    addr1=alloc_addr(i);                        ;get physical address of i'th block
    length1=alloc_len(i)                        ;and length
    addr2=low_alloc(length1);                   ;allocate an equivalent space at lowest
                                                ;possible physical address
    phys_copy(addr1,addr2,length1);             ;move memory to newly allocated space
    de_alloc(addr1);                            ;release the old block
    table[i][1]=addr1;                          ;store compression parameters for later expansion
    table[i][2]=addr2;
    table[i][3]=length1;
    if(i=0) }
        first_addr=addr2;                       ;save beginning address for later
        }
}
last_addr=addr2+length1;                        ;calculate last address of packed memory image
Stage 2
Employ loss-less compression to reduce physical memory requirements
len_after_comp=loss_less_comp(first_addr,last_addr);   ;optimally compress memory image
                                                ;from first to last address leaving compressed
                                                ;image at first_addr
addr3=alloc(len after comp);                    ;allocate a temporary space
phys_copy(first_addr,addr3,len_after_comp);     ;move compressed image to there
for(i=0;i<n;i++) }                              ;free all memory at first_addr
    addr1=alloc_addr(i);                        ;get physical address of i'th block
    de_alloc(addr1);                            release the old block
```

-continued

```
}
addr4+low_alloc(len_after_comp);              ;re-allocate a smaller block
                                              ;at first_addr
phys_copy(addr3,addr4,len_after_comp);        ;move compressed image down
de_alloc(addr3);                              ;and free temp space
Stage 3
Further compress the image into the smallest number of physical DRAM chips
This code is highly dependent upon the memory organization, both in native word-size and DRAM chip
organization. In the following, assume that: Word size is 8-bits; DRAM organization is 4-bits wide ×
m_dramsize
words_per_bank=m_dramsize;
chips_per _bank=8/4;
chips_now_used=(int)(len_after_comp/(words_per_bank/chips_per_bank));
chips_now_used+=chips_per_bank;               ;round up
bits_needed+len_after_comp*8;                 ;total number of bits needed
chips_needed=bits_needed/(4*m_dramsize);      ;number of physical chips needed
if(chips_needed<chips_now_used){
    for(i=0;i<len_after_comp;i++){
        addr5=i+addr4;                        ;for all words
                                              ;running address
        addr5=i+len_after_comp+addr4;
        a=high_bits(addr5)                    ;get high 4 bits of data at addr5
        *addr6=a;                             ;and copy to low bit position at addr6
    }
}
At this point, the system may remove power from all memory chips except the lowest "chips_needed"
physically addressed.
Further power_down processing may be neccessary...........
Power-up and recovery of the data image is accomplished by simply reversing the steps of stages 3,2,1 in
that order. Step 1 uses the info stored in the array "table[][]" to exactly re-create the image.
```

Although not shown, it should be understood that, responsive to a command to return to full power mode, the above routines are executed in reverse order, with power being applied to all of the RAM chips, the blocks of data being copied back to the appropriate RAM chip, decompressed and then "unpacked," i.e., copied back to their original locations using the values stored during step 314 (FIG. 3a).

It will be understood by persons skilled in the art that if the RAM chips 200a, 200b are DRAMs, at least eight (8) RAS pulses must be applied to a chip 200a or 200b that has been powered down for any length of time before data may be written to that chip, as the cells therein must be rejuvenated.

It should also be clear from the above discussion that it is possible to cause the subsystem 12 to operate in two separate reduced power consumption modes. For example, the subsystem 12 may be caused to operate in a first power consumption mode after a period of I/O inactivity of a first predetermined length, for example, five (5) minutes, or responsive to a user's depressing a key on the computer that has been designated for that purpose. In this first reduced power consumption mode, the data is packed, as described with respect to FIG. 3a, and then copied to the minimum number of chips capable of storing the packed data, with the unused chips being powered down as described with reference to FIG. 3c.

After a longer second period of inactivity, for example, fifteen (15) minutes, or responsive to the user's depressing a designated key, the subsystem may be caused to operate in a second reduced power consumption mode, in which the packed data is compressed, as described with reference to FIG. 3b, and copied to the minimum number of chips capable of storing the compressed data, with the remaining chips being powered down, as described with reference to FIG. 3c. The provision of two separate modes of reduced power consumption would be desirable in cases where it would be too time consuming to decompress and unpack all the data after each short period of inactivity. In this case, the second mode might be entered only after a period of inactivity that is so long as to indicate that the user has forgotten to turn off the computer. Alternatively, the data may be packed and compressed each time the subsystem is caused to operate in a low power consumption mode, as described above with respect to FIGS. 3a–3c.

While the present invention will result in a significant power savings regardless of the type of RAM chips used to implement the subsystem 20 or the size of the subsystem 20, the exact figures will obviously be dependent on those factors. For example, if the subsystem 20 is implemented using Micron MT4C4001-80 1MB×4 DRAM chips, which are commercially available from Micron, the average refresh current per row of DRAM will be 500 nA, with an average refresh current per DRAM of 0.256 mA (500 nA×512 rows of DRAM). Therefore, with regard to this exemplary implementation of the subsystem 20, a current savings of 0.256 mA is realized for each DRAM chip that need not be refreshed.

It is understood that the present invention can take many forms and embodiments. The embodiments shown herein are intended to illustrate rather than to limit the invention, it being appreciated that variations may be made without departing from the spirit of the scope of the invention. For example, the system of the present invention can be implemented in connection with a RAM subsystem comprising any number of RAM chips. In addition, the RAM chips may be of any size and arranged in any conventional configuration.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A method of reducing the amount of power consumed by a random access memory (RAM) subsystem of a computer, said RAM subsystem comprising a plurality of RAM devices for storing data, the method comprising the computer-implemented steps of:

moving blocks of said data stored at noncontiguous address locations in a first number of said RAM devices such that said data blocks in each said RAM device are combined into a contiguous block of packed data in each said RAM device;

computing a first minimum number of said RAM devices needed to store all of said packed data;

copying said packed data from said first number of said RAM devices to said first minimum number of said RAM devices; and removing power from all but said first minimum number of said RAM devices into which said packed data has been copied, such that all of said data is stored only in said minimum number of said RAM devices, thereby reducing power consumption.

2. The method of claim 1 further comprising:

compressing said packed data stored in said minimum number of RAM devices in a lossless manner such that said compressed data comprises fewer bits than said packed data;

computing a second minimum number of said RAM devices needed to store said compressed data; and when said second minimum number is less than said first minimum number, copying said compressed data from said first minimum number of RAM devices to said second minimum number of said RAM devices and removing power from all but said second minimum number of RAM devices into which said compressed data has been copied, thereby further reducing power consumption.

3. The method of claim 1 further comprising:

applying power to all of said RAM devices;

copying blocks of said packed data from said first minimum number of said RAM devices to separate ones of said first number of said RAM devices; and moving said packed data into said noncontiguous data blocks such that said data is no longer packed.

4. The method of claim 2 further comprising:

applying power to all of said RAM devices;

if said second minimum number of said RAM devices is less than said first minimum number of said RAM devices, copying blocks of said compressed data from said second minimum number of said RAM devices to separate ones of said first minimum number of said RAM devices;

decompressing said compressed data into said packed data;

copying blocks of said packed data from said first minimum number of said RAM devices to separate ones of said first number of said RAM devices; and moving said packed data into said noncontiguous data blocks such that said data is no longer packed.

5. The method of claim I wherein each of said RAM devices each comprise a dynamic RAM device and said removal of power comprises refreshing only said minimum number of said RAM devices into which said data has been copied.

6. A method of operating a random access memory (RAM) subsystem of a computer in a reduced power consumption mode, wherein said RAM subsystem comprises a plurality of RAM devices in which data is stored, said computer responsive to commands to operate in a full power consumption mode and said reduced power consumption mode, the method comprising the computer-implemented steps of:

responsive to a command to operate in said reduced power consumption mode, moving noncontiguous blocks of said data stored in a first number of said RAM devices such that said data blocks in each said RAM device are combined into a contiguous block of packed data in each said RAM device;

compressing said packed data such that said compressed data comprises fewer data bits than said packed data;

determining a minimum number of said RAM devices needed to store all of said compressed data;

copying said compressed data from said first number of said RAM devices to said minimum number of said RAM devices; and removing power from all but said minimum number of said RAM devices into which said compressed data has been copied, such that all of said data is stored only in said minimum number of said RAM devices, thereby reducing power consumption.

7. The method of claim 6 wherein each of said RAM devices comprise a static RAM device.

8. The method of claim 6 wherein each of said RAM devices comprise a dynamic RAM device and said removal of power comprises refreshing only said minimum number of said RAM devices into which said compressed data has been copied.

9. The method of claim 6 further comprising: responsive to a command to operate in a full power mode, applying power to said first number of said RAM devices;

copying said compressed data from said minimum number of RAM devices to said first number of RAM devices;

decompressing said compressed data into said packed data;

unpacking said packed data into said noncontiguous data blocks.

10. The method of claim 6 wherein said command to operate in said reduced power consumption mode is issued responsive to expiration of a predetermined time period during which no data has been read from or written to said RAM subsystem.

11. The method of claim 9 wherein said command to operate in said full power mode is issued responsive to data being read from or written to said RAM subsystem.

12. The method of claim 6 wherein said command to operate in said reduced power consumption mode is issued responsive to actuation of a key on said computer.

13. The method of claim 9 wherein said command to operate in said full power mode is issued responsive to actuation of a key on said computer.

14. A method of reducing the amount of power consumed by a random access memory (RAM) subsystem of a computer, said RAM subsystem comprising a plurality of RAM devices each storing blocks of data in memory addresses, said computer responsive to commands to operate in both full and reduced power consumption modes, the method comprising the computer-implemented steps of:

responsive to a command to operate in a reduced power consumption mode, packing said data blocks, said packing with respect to each said data block comprising:

copying said data block from a first memory address to a second memory address of said RAM device, wherein said second memory address represents unallocated memory of sufficient size to store said data block and is located at the lowest possible unallocated physical memory address location of said RAM device; and deallocating said first memory address data block;

copying said packed data from said RAM devices to a first group of at least one said RAM device, wherein said first group is comprised of the minimum number of said RAM devices needed for storing all of said packed data; and removing power from all of said RAM devices except said first group of said RAM devices, such that said data is stored only in said minimum number of RAM devices, thereby reducing power consumption.

15. The method of claim 14 further comprising:

responsive to a command to operate in said full power mode, applying power to all of said RAM devices;

copying said packed data from said first group to said plurality of said RAM devices; and unpacking said packed data blocks to their original memory addresses.

16. The method of claim 15 further comprising:

said step of packing further including storing pointers representing said first address of each said data block;

said step of unpacking further including copying said data block from said second address to said first address, wherein said first address of said data block is determined by said stored pointer; and said step of unpacking further including deallocating said second memory address.

17. The method of claim 16 wherein said pointer is stored with said packed data at said second memory address.

18. A method of reducing the amount of power consumed by a random access memory (RAM) subsystem of a computer, said RAM subsystem comprising a plurality of RAM devices each storing blocks of data in memory addresses, said computer responsive to commands to operate in both full and reduced power consumption modes, the method comprising the computer-implemented steps of:

responsive to a command to operate in a reduced power consumption mode, packing said data blocks, said packing with respect to each said data block comprising copying said data block from a first memory address to a second memory address of said RAM device, wherein said second memory address represents unallocated memory of sufficient size to store said data block and is located at the lowest possible unallocated physical memory address location of said RAM device; deallocating said first memory address data block; and storing a pointer indicating said first address of said data block;

compressing said packed data using a lossless data compression method;

copying said compressed data from said RAM devices to a first group of at least one said RAM device, wherein said first group is comprised of the minimum number of said RAM devices needed for storing all of said compressed data;

removing power from all of said RAM devices except said first group of said RAM devices, such that said data is stored only in said minimum number of RAM devices, thereby reducing power consumption;

responsive to a command to operate in said full power mode, applying power to all of said RAM devices;

copying said compressed data from said first group to said plurality of said RAM devices;

decompressing said compressed data; and unpacking said packed data blocks to their original first memory addresses by copying each said data block from said second address to said first address, wherein said first address of each said data block is indicated by said stored pointer, and said second memory address is deallocated.

19. A computer capable of operating in a reduced power consumption mode, the computer comprising:

a random access memory (RAM) subsystem having a plurality of RAM devices each including memory addresses for storing data;

a memory controller connected to said RAM subsystem for controlling the data storage status of said memory addresses;

a central processing unit (CPU) and a memory connected to said memory controller;

instructions stored in said memory and executed in said CPU, comprising:

logic for operating said controller to move noncontiguous blocks of said data stored in a first number of said RAM devices so that said individual data blocks are combined into a single contiguous block of packed data in each said RAM device;

logic for operating said controller to determine a first minimum number of said RAM devices needed to store all of said packed data;

logic for operating said controller to copy said packed data from said first number of said RAM devices to said first minimum number of said RAM devices; and logic for operating said controller to remove power from all but said first minimum number of said RAM devices into which said packed data has been copied, such that all of said data is stored only in said minimum number of said RAM devices, thereby reducing power consumption.

20. The computer of claim 19 said instructions further comprising: logic for operating said controller to compress said packed data stored in said minimum number of RAM devices in a lossless manner such that said compressed data comprises fewer bits than said packed data;

logic for operating said controller to compute a second minimum number of said RAM devices needed to store said compressed data; and when said second minimum number is less than said first minimum number, logic for operating said controller to copy said compressed data from said first minimum number of RAM devices to said second minimum number of said RAM devices and removing power from all but said second minimum number of RAM devices into which said compressed data has been copied, thereby further reducing power consumption.

21. The computer of claim 19 said instructions further comprising:

responsive to a command to operate in a full power consumption mode, logic for operating said controller to apply power to all of said RAM devices;

logic for operating said controller to copy blocks of said packed data from said first minimum number of said RAM devices to separate ones of said first number of said RAM devices; and logic for operating said controller to move said packed data into said individual data blocks such that each of said data blocks is again in said distinct location, said data no longer being packed.

22. The computer of claim 20 said instructions further comprising:

logic for operating said controller to apply power to all of said RAM devices;

if said second minimum number of said RAM devices is less than said first minimum number of said RAM devices, logic for operating said controller to copy blocks of said compressed data from said second minimum number of said RAM devices to separate ones of said first minimum number of said RAM devices;

logic for operating said controller to decompress said compressed data into said packed data;

logic for operating said controller to copy blocks of said packed data from said first minimum number of said RAM devices to separate ones of said first number of said RAM devices; and.

logic for operating said controller to move said packed data into said noncontiguous data blocks such that said data is no longer packed.

23. A computer program for operating a computer in a reduced power consumption mode, the computer including a random access memory (RAM) subsystem having a plurality of RAM devices each including memory addresses for storing data, a memory controller connected to said RAM subsystem for controlling the data storage status of said memory addresses, and a central processing unit (CPU) and a memory connected to said memory controller, the program comprising:

instructions stored in said memory and executed in said CPU, comprising:

logic for operating said controller to move noncontiguous blocks of said data stored in a first number of said RAM devices so that said individual data blocks are combined into a single contiguous block of packed data in each said RAM device;

logic for operating said controller to determine a first minimum number of said RAM devices needed to store all of said packed data;

logic for operating said controller to copy said packed data from said first number of said RAM devices to said first minimum number of said RAM devices; and logic for operating said controller to remove power from all but said first minimum number of said RAM devices into which said packed data has been copied, such that all of said data is stored only in said minimum number of said RAM devices, thereby reducing power consumption.

* * * * *